US006939612B2

(12) United States Patent
Reyntjens

(10) Patent No.: US 6,939,612 B2
(45) Date of Patent: Sep. 6, 2005

(54) FLUORINATED POLYMER SHEETS

(75) Inventor: Wouter Gerard Simonne Reyntjens, Wetteren (BE)

(73) Assignee: Solutia Incorporated, St. Louis, MO (US)

( * ) Notice: Subject to any disclaimer, the term of this patent is extended or adjusted under 35 U.S.C. 154(b) by 0 days.

(21) Appl. No.: 10/452,146

(22) Filed: Jun. 3, 2003

(65) Prior Publication Data

US 2004/0247883 A1 Dec. 9, 2004

(51) Int. Cl.[7] .......................... B32B 17/10; C23C 16/00

(52) U.S. Cl. .................. 428/437; 427/255.39; 428/436; 428/451; 428/524

(58) Field of Search ..................... 427/255.39; 428/436, 428/437, 451, 524

(56) References Cited

U.S. PATENT DOCUMENTS 3,841,890 A 10/1974 Coaker et al.
4,144,217 A 3/1979 Snelgrove et al.
4,276,351 A * 6/1981 Phillips ...................... 428/437
4,743,419 A * 5/1988 Bierschenk .................. 137/83
5,013,779 A 5/1991 Fariss et al.
5,131,967 A 7/1992 Tweadey, II et al.
5,208,095 A * 5/1993 Nietering .................... 428/215
5,626,910 A * 5/1997 Tanabe et al. ......... 427/255.26
5,657,149 A 8/1997 Buffat et al.
5,849,402 A 12/1998 Kraemling et al.
5,889,608 A 3/1999 Buffat et al.
5,908,704 A 6/1999 Friedman et al.
6,001,487 A 12/1999 Ladang et al.
6,010,775 A 1/2000 Kraemling et al.
6,068,914 A 5/2000 Boire et al.
6,337,124 B1 1/2002 Anderson et al.
6,352,754 B1 3/2002 Frost et al.
6,372,352 B1 4/2002 Bletsos et al.
6,493,128 B1 12/2002 Agrawal et al.
6,532,120 B1 3/2003 Harada et al.
6,621,534 B2 9/2003 Lin et al.
6,627,319 B2 9/2003 Jacquiod et al.
6,639,708 B2 10/2003 Elkadi et al.
6,643,050 B2 11/2003 Rukavina et al.
6,720,082 B1 4/2004 Hashimoto et al.
6,726,979 B2 4/2004 Friedman et al.
6,746,775 B1 6/2004 Boire et al.
2001/0026261 A1 10/2001 Walker et al.
2002/0034627 A1 3/2002 Jacquiod et al.
2002/0094407 A1 7/2002 Frost et al.
2002/0118437 A1 8/2002 Rukavina et al.
2002/0151632 A1 10/2002 Tarnawskyj et al.
2002/0196519 A1 12/2002 Elkadi et al.
2003/0111159 A1 6/2003 Hashimoto et al.
2003/0162028 A1 8/2003 Friedman et al.
2004/0067343 A1 4/2004 Beteille et al.

FOREIGN PATENT DOCUMENTS

GB 1018269 8/1950
GB 642269 1/1966
JP 53102380 9/1978
JP 8188660 7/1996

OTHER PUBLICATIONS

Nayak and Tollefson, *An Experimental Design Approach: Effect of Slip and Antiblocking Agents on the Performance of a LLDPE Polymer,* Society of Plastics Engineers, Annual Technical Conference (ANTEC), 1999, p2304–p2307.

* cited by examiner

*Primary Examiner*—D. S. Nakarani
(74) *Attorney, Agent, or Firm*—Brenc Law

(57) ABSTRACT

The present invention is in the field of polymer sheet anti-blocking and adhesion control compositions and methods, and more specifically, the present invention is in the field of polymer sheets, for example polyvinyl butyral sheets, having improved anti-blocking and adhesion properties obtained through fluorination.

32 Claims, 1 Drawing Sheet

FLUORINATED POLYMER SHEETS

FIELD OF THE INVENTION

The present invention is in the field of polymer sheet anti-blocking and adhesion control compositions and methods, and more specifically, the present invention is in the field of polymer sheets having anti-blocking and adhesion properties obtained through fluorination.

BACKGROUND

Polyvinyl butyral (hereinafter "PVB") is commonly used in the manufacture of polymer sheets that can be used as interlayers in light-transmitting laminates such as safety glass or polymeric laminates. Safety glass typically refers to a transparent laminate comprising a PVB sheet disposed between two panes of glass. Safety glass often is used to provide a transparent barrier in architectural and automotive openings. Its main function is to absorb energy, such as that caused by a blow from an object, without allowing penetration through the opening. Additives to the sheet formulation generally include at least one adhesion control agent (hereinafter, "ACA") to modify adhesion of the sheet to the glass so that a suitable level of adhesion can be maintained in order to prevent spalling of the glass while still providing adequate energy absorption if an impact occurs.

The polymer interlayer sheet can also be modified to impart additional desirable characteristics to safety glass. For example, polymer interlayer sheets can be produced to better attenuate acoustic noise, reduce UV and/or IR light transmission, and/or enhance the aesthetic appeal of openings.

Safety glass can be formed by a process in which two layers of glass and a plastic interlayer, such as PVB, are assembled into a pre-press, tacked into a pre-laminate, and finished into an optically clear laminate. The assembly phase can involve laying down a piece of glass, overlaying a PVB sheet on that glass, laying down a second piece of glass on the PVB sheet, and then trimming the excess PVB to the edges of the glass layers.

The plastic interlayer can be produced by mixing PVB polymer with one or more plasticizers, and optionally with one or more other ingredients, and melt processing the mix into sheeting, which typically is collected and rolled for storage and transportation.

During one lamination process for automotive windshields, sections of PVB sheet are cut from the roll and these cut sections are shaped and/or stacked for assembly. A cut section then is taken from the stack and assembled in a layered arrangement with a rigid substrate (for example, a glass sheet having a particular optical quality) such that a face of the rigid substrate and a face of the cut section are disposed in contact with each other to form a pre-press laminate assembly. Alternatively, this laminate assembly can be formed by interleaving multiple cut sections with multiple rigid sheets.

Plasticized PVB sheet, whether in roll form or in stacked form, can tend to stick to itself or "block" at temperatures that can be encountered before and during the laminating process. This blocking is generally not desirable, and can lead to increased production costs.

Conventional attempts to enhance the blocking resistance of PVB include mechanical roughing of the sheet surfaces (for example, embossing), applying a powder such as sodium bicarbonate to the sheet surfaces in contact with each other, and chemically treating the surfaces of the PVB sheeting. Such surface treatments can, however, often create undesirable handling or adhesion properties.

In other conventional methods used to prevent blocking, PVB sheeting can be interleaved with another sheet material, such as polyethylene, or can be stored and transported under refrigeration, for example at temperatures from about 5° C. to about 15° C. However, for some compositions of PVB sheeting, such as PVB sheeting having relatively high plasticizer content, these anti-blocking techniques may not produce optimal results.

Another technique for preventing blocking entails incorporating anti-blocking materials into the PVB. Incorporation of such materials into the PVB, however, can adversely affect the optical properties of the resulting laminate or the adhesive properties of the finished PVB.

Accordingly, further improved compositions and methods are needed to enhance the blocking resistance of polymer sheets, and specifically PVB sheets, without adversely affecting the optical clarity of the finished laminates of the glass or adhesion properties of the resulting PVB sheet.

SUMMARY OF THE INVENTION

It surprisingly has been discovered, according to the present invention, that a polymer sheet surface treated with fluorine results in enhanced anti-blocking characteristics without adverse optical and/or adhesion effects. The present invention is in the field of polymer sheet anti-blocking and adhesion control compositions and methods, and more specifically, the present invention is in the field of polymer sheets having anti-blocking and adhesion properties obtained through fluorination. In one embodiment, polyvinyl butyral sheets are subjected to fluorine gas during production in order to provide the finished polymer sheet with improved anti-blocking and adhesion characteristics.

The present invention includes a polymer sheet comprising polyvinyl butyral, wherein said polyvinyl butyral comprises a fluorine component.

The present invention includes a method of manufacturing a polymer sheet, comprising: forming said polymer sheet, wherein said polymer sheet has two surfaces and comprises polyvinyl butyral; and, applying $F_2$ to at least one of said two surfaces.

The present invention includes a laminated glass structure comprising a layer of silicon dioxide disposed in contact with a polymer sheet, wherein said polymer sheet comprises polyvinyl butyral comprising a fluorine component.

DETAILED DESCRIPTION

Figure 1:
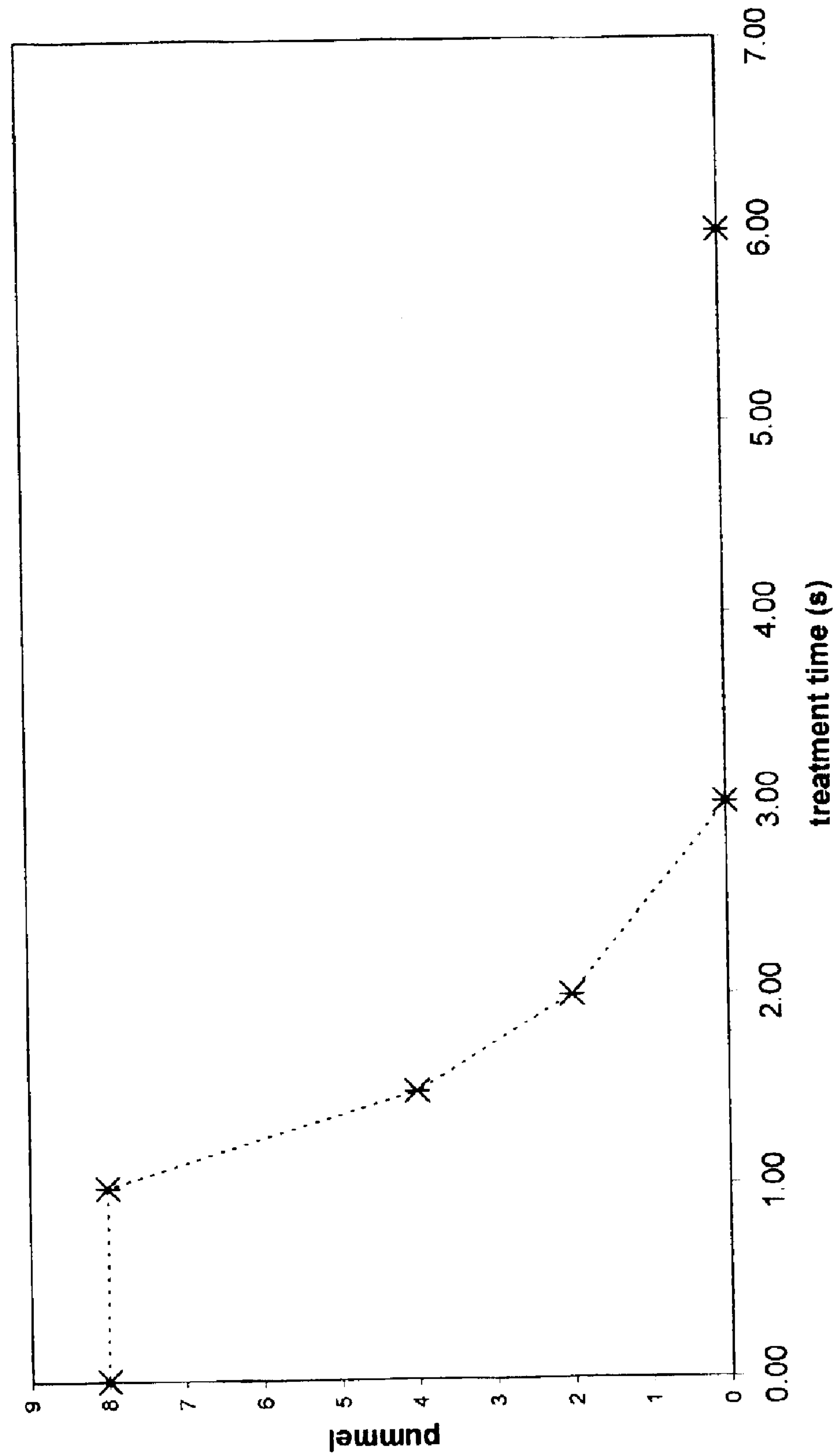
FIG. 1 represents a graph of treatment time versus pummel for one embodiment of fluorinated PVB sheets.

The present invention includes methods of fluorinating polymer sheets to impart improved anti-blocking and adhesion qualities to those sheets. The present invention also includes polymer sheets comprising fluorine introduced from treatment of the polymer sheets with diatomic fluorine ($F_2$). The present invention further includes finished products, including laminated glass and plastic products, comprising any of the polymer sheets of the present invention. In one embodiment, polyvinyl butyral sheets are subjected to fluorine gas during production in order to provide a finished polymer sheet with improved anti-blocking and adhesion characteristics.

The present invention is directed to polymer compositions comprising a plasticized polymer in sheet form that has been exposed to fluorine to provide anti-blocking and adhesion control, methods for making the same, and applications using such polymer sheets.

In one embodiment, the present invention comprises a polymer sheet comprising polyvinyl butyral, wherein said polyvinyl butyral comprises a fluorine component.

As used herein, a "polymer sheet" means any polymer composition formed by any suitable method into a thin layer that is suitable for use as an interlayer in laminated glass structures. The two surfaces referred to above arc the surfaces of the polymer sheet that are conventionally placed in contact with glass when a glass-polymer sheet-glass laminate is formed.

The polymer sheet can comprise any suitable polymer, and, in a preferred embodiment, the polymer sheet comprises PVB. In one embodiment, a polymer sheet of the present invention has a polymer consisting of or consisting essentially of PVB. In this embodiment, any of the variations in fluorine or other additives disclosed herein can be used with the polymer sheet having a polymer consisting of or consisting essentially of PVB.

In one embodiment, the polymer sheet comprises a polymer based on partially acetalized polyvinyl alcohols. In another embodiment, the polymer sheet comprises a polymer selected from the group consisting of polyvinyl butyral, polyurethane, polyvinyl chloride, poly(ethylene vinyl acetate), combinations thereof, and the like. In one embodiment, the polymer sheet comprises polyvinyl butyral. In other embodiments, the polymer sheet comprises plasticized polyvinyl butyral. In further embodiments the polymer sheet comprises PVB and one or more other polymers. Other polymers having a suitable glass transition temperature can also be used. In any of the sections herein in which preferred ranges, values, and/or methods are given specifically for PVB (for example, and without limitation, for plasticizers, component percentages, thicknesses, and characteristic-enhancing additives), those ranges also apply, where applicable, to the other polymers and polymer blends disclosed herein as useful as components in polymer sheets.

For embodiments comprising PVB, the PVB can be produced by known acetalization processes which involve reacting PVOH with butyraldehyde in the presence of acid catalyst, followed by neutralization of the catalyst, separation, stabilization, and drying of the resin.

In various embodiments, the polymer sheet comprises 10 to about 35 weight percent (wt. %) hydroxyl groups calculated as PVOH, 13 to 30 wt. % hydroxyl groups calculated as PVOH, or 15 to about 22 wt. % hydroxyl groups calculated as PVOH. The polymer sheet can also comprise less than 15 wt. % residual ester groups, 13 wt. %, 11 wt. %, 9 wt. %, 7 wt. %, 5 wt. %, or less than 3 wt. % residual ester groups calculated as polyvinyl acetate, with the balance being an acetal, preferably butyraldehyde acetal, but optionally including other acetal groups, e.g., a 2-ethyl hexanal-group.

In various embodiments, the polymer sheet comprises PVB having a molecular weight greater than 50,000, 55,000, 60,000, 65,000, or 70,000 grams per mole (g/mole). As used herein, the term "molecular weight" means the weight average molecular weight.

Any suitable method of making PVB can be used to produce the polymer sheets of the present invention prior to application of $F_2$. Details of suitable processes for making PVB are known to those skilled in the art. PVB is commercially available from, for example, Solutia Inc., St. Louis, Mo. as Butvar™ resin.

Additives may be added to the PVB polymer to enhance its performance in a final product. Such additives include, but are not limited to, dyes, pigments, stabilizers (e.g., ultraviolet stabilizers), antioxidants, combinations of the foregoing additives, and the like.

In various embodiments of polymer sheets of the present invention, the polymer sheets can comprise 10 to 90, 15 to 85, 20 to 60, 25 to 60, 20 to 80, 25 to 70, and 25 to 60 parts plasticizer per one hundred parts of resin ("phr"). Of course other quantities can be used as is appropriate for the particular application. The PVB sheet preferably comprises about 20 to 80, and more preferably about 25 to 60, parts plasticizer per one hundred parts of resin ("phr"). In some embodiments, the plasticizer has a hydrocarbon segment of less than 20, less than 15, less than 12, or less than 10 carbon atoms.

The amount of plasticizer can be adjusted to affect the glass transition temperature ($T_g$) of the PVB sheet. In general, higher amounts of plasticizer are added to decrease the $T_g$. PVB polymer sheets of the present invention can have a $T_g$ of 40° C. or less, 35° C. or less, 30° C. or less, 25° C. or less, 20° C. or less, and 15° C. or less. PVB sheets having a $T_g$ lower than about 20° C. are often used as acoustic PVB sheets.

Any suitable plasticizers can be added to the polymer resins of the present invention in order to form the polymer sheets. Plasticizers used in the polymer sheets of the present invention can include esters of a polybasic acid or a polyhydric alcohol, among others. Suitable plasticizers include, for example, triethylene glycol di-(2-ethylbutyrate), triethylene glycol di-(2-ethylhexanoate), triethylene glycol diheptanoate, tetraethylene glycol diheptanoate, dihexyl adipate, dioctyl adipate, hexyl cyclohexyladipate, mixtures of heptyl and nonyl adipates, diisononyl adipate, heptylnonyl adipate, dibutyl sebacate, polymeric plasticizers such as the oil-modified sebacic alkyds, and mixtures of phosphates and adipates such as disclosed in U.S. Pat. No. 3,841,890 and adipates such as disclosed in U.S. Pat. No. 4,144,217, and mixtures and combinations of the foregoing. Other plasticizers that can be used are mixed adipates made from $C_4$ to $C_9$ alkyl alcohols and cyclo $C_4$ to $C_{10}$ alcohols, as disclosed in U.S. Pat. No. 5,013,779. and $C_6$ to $C_8$ adipate esters, such as hexyl adipate.

The PVB polymer and plasticizer additives can be thermally processed and configured into sheet form according to methods known to those of ordinary skill in the art. One exemplary method of forming a PVB sheet comprises extruding molten PVB resin+plasticizer+additives (hereinafter "melt") by forcing the melt through a sheet die (for example, a die having an opening that is substantially greater in one dimension than in a perpendicular dimension). Another exemplary method of forming a PVB sheet comprises casting molten resin or semi-molten resin from a die onto a roller, solidifying the resin, and subsequently removing the solidified resin as a sheet. In either embodiment, the surface texture at either or both sides of the sheet may be controlled by adjusting the surfaces of the die opening or by providing texture at the roller surface. Other techniques for controlling the sheet texture include varying parameters of the reactant materials (for example, the water content of the resin and/or the plasticizer, the melt temperature, or combinations of the foregoing parameters). Furthermore, the sheet can be configured to include spaced projections that define a temporary surface irregularity to facilitate the de-airing of the sheet during lamination processes after which the elevated temperatures and pressures of the laminating process cause the projections to melt into the sheet, thereby resulting in a smooth finish. In various embodiments, the polymer sheets can have thicknesses of 0.1 to about 2.5 millimeters, 0.2 to about 2.0 millimeters, 0.25 to about 1.75 millimeters, and 0.3 to about 1.5 millimeters (mm).

In one embodiment, the present invention includes a method of manufacturing a polymer sheet, comprising: forming said polymer sheet, wherein said polymer sheet has two surfaces and comprises polyvinyl butyral; and, applying $F_2$ to at least one of said two surfaces.

In other embodiments, the $F_2$ can be applied to both of the surfaces of the polymer sheet. Any of the polymer sheets disclosed elsewhere herein, including any of the combinations given, can be used in the methods of the present invention. For any of the methods of manufacturing a polymer composition of the present invention disclosed herein, those methods also constitute methods of controlling or improving the adhesiveness of a polymer compounds in the form of polymer sheets and methods of preventing blocking in stacked or rolled polymer compounds in the form of polymer sheets.

The $F_2$ can be applied to the polymer sheet in any suitable manner. In one embodiment, $F_2$ is applied to the polymer sheet by exposing the polymer sheet to $F_2$ gas. The $F_2$ gas can be any suitable form. In one embodiment, pure $F_2$ is used. In another embodiment, the $F_2$ can be mixed with any suitable inert gas, for example, neon, in order to provide the $F_2$ in a suitable concentration and a manageable form. In various embodiments, polymer sheet is exposed to $F_2$ gas at a concentration of 0.1% to 50%, 0.1% to 40%, 0.1% to 30%, 0.1% to 20%, 0.1% to 15%, 0.1% to 10%, 0.1% to 5%, 0.1% to 2.5%, and 0.1% to 1.5%. In other embodiments, $F_2$ gas at a concentration of at least 0.1%, 0.5%, 1.0%, 5.0%, and 10.0% is used. In various embodiments, the polymer sheet can be exposed to the $F_2$ gas for between 1 and 100 seconds, 1 and 50 seconds, 1 and 25 seconds, 1 and 15 seconds, 1 and 10 seconds, 0.5 and 10 seconds, 0.1 and 10 seconds, and 0.1 and 5 seconds. The temperature of the gas and the polymer sheet can be any temperature that is suitable for the process being used. In various embodiments, the temperature of the polymer sheet and gas is −50° C. to 100° C., −30° C. to 80° C., −15° C. to 70° C., −5° C. to 50° C., 5° C. to 40° C., 10° C. to 30° C., and 15° C. to 25° C. In various embodiments, the $F_2$ gas can be exposed to the polymer sheet at between 0.1 and 50 atmospheres (atms) pressure, and between 0.5 and 25 atms, 0.75 and 10 atms, 1.0 and 5.0 atms, and 0.75 and 1.25 atms. Any combinations of the above gases, percentages, times, and temperatures can be used, depending on the application, and values other than those explicitly given can be used, depending on the application, and are considered within the spirit and scope of the invention.

In some embodiments, $F_2$ is applied to both surfaces of the polymer sheet to different or the same concentrations, as disclosed above.

By altering the final $F_2$ concentration on the polymer sheet, the adhesiveness of the polymer sheet to various materials can be altered. In one embodiment, as shown in FIG. 1, the adhesiveness of a polymer sheet to glass is reduced by the addition of $F_2$ to the surface of the polymer sheet. In a preferred embodiment, polymer sheets of the present invention have a pummel measurement of at least 4, 5, 6, 7, 8, 9, or 9.5.

The gaseous fluorination described above can be carried out in, for example, a batch-to-batch operation or on a roll-to-roll operation. Apparatuses useful for such production are disclosed in European patents/applications EP 1090864 A2 and EP0502303 B1. Distributors of devices that can apply $F_2$ to polymer sheets in line in a continuous roll process include those manufactured by Fluor Technik in Germany and Fluoro-Seal in Houston, Tex. In various embodiments, polymer sheet is rolled or stacked after formation and application of $F_2$. In another embodiment, the present invention includes producing any of the polymer sheets of the present invention and applying $F_2$ in a continuous roll machine.

Also included in the present invention are stacks or rolls of any of the polymer compositions of the present invention disclosed herein in any combination.

Further, the present invention includes a laminated safety glass comprising a layer of glass, typically silicon dioxide, disposed in contact with any of the fluorinated polymer sheets of the present invention. Further included is a laminated safety glass comprising sheets of glass with an interlayer polymer sheet disposed therebetween wherein the polymer sheet is any of the fluorinated polymer sheets disclosed herein as embodiments of the present invention.

In addition to the $F_2$ of the present invention, other anti-blocking components can be applied to or incorporated into the polymer sheets of the present invention, as are known in the art. The additional anti-blocking agents can also be incorporated with the PVB sheet surface by various coating technologies, including, but not limited to, spray techniques, gravure, electrostatic technology, immersion (dipping) techniques, and the like. In the spray coating process, the agent is disposed in a liquid carrier, atomized, and projected at the surface of the PVB sheet. The carrier may be aqueous, or solvent-based (e.g., organic oxygen containing solvents) and can be applied as a dispersion of fine particles. The concentration of the anti-block agent in the carrier should be sufficient to achieve the desired performances. In general, the agent is disposed in the liquid carrier preferably at a concentration of 0.1 to 15% by weight; more preferably 0.5 to 10%; most preferably 1 to 5%. In one embodiment, one side of the surface is coated with the agent. In the dipping process, the extruded PVB sheet is immersed in a dispersion carrying the anti-block agent. Once the agent is deposited on the PVB sheet, the carrier can be volatilized off, thereby leaving the anti-block agent on the surface of the PVB sheet.

The clarity of a polymer sheet, and particularly a PVB sheet, can be determined by measuring the haze value, which is a quantification of light not transmitted through the sheet. The haze value can be determined according to ASTM D1003-61. In any of the embodiments of the present invention, the haze value can be less than about 3%, more preferably less than about 2%, and most preferably less than about 1%.

Pummel adhesion can be measured according to the following technique, and where "pummel" is referred to herein to quantify adhesion of a polymer sheet to glass, the following technique is used to determine pummel. Two-ply glass laminate samples are prepared with standard autoclave lamination conditions. The laminates are cooled to about −17° C. (0° F.) and manually pummeled with a hammer to break the glass. All broken glass that is not adhered to the PVB sheet is then removed, and the amount of glass left adhered to the PVB sheet is visually compared with a set of standards. The standards correspond to a scale in which varying degrees of glass remain adhered to the PVB sheet. In particular, at a pummel standard of zero, no glass is left adhered to the PVB sheet. At a pummel standard of 10, 100% of the glass remains adhered to the PVB sheet.

Blocking can be measured according to the following technique, and, as used and referred to herein, "blocking force" is determined using the following technique. Two rectangular filmstrips are cut and placed together in completely overlapping pairs. The top sheet of each pair is adhered to a piece of tape of a corresponding size. The film pairs are placed centrally between two steel plates and the assembly is subjected to 69 kilo Pascal pressure at a temperature range of about 7° C.–25° C. for 24 hours. The strips can then be peeled apart in a 90-degree peel test by a peel testing apparatus at a peel speed of 84 inches per minute. The blocking force is quantified in pounds per linear inch (PLI). In various embodiments, the fluorine applied to the PVB and other polymer sheets of the present invention is applied in a concentration sufficient to impart a blocking force of less than 2.5 pounds per linear foot (PLI), less than 2.25 PLI, less than 2.0 PLI, less than 1.75, PLI, less than 1.5 PLI, less than 1.25 PLI, less than 1.0 PLI, less than 0.8 PLI, less than 0.6 PLI, less than 0.5 PLI, less than 0.4 PLI, less than 0.3 PLI, less than 0.2 PLI, and less than 0.1 PLI. As used herein, "applied under conditions sufficient to impart a blocking force of less" than a certain amount, includes conditions such as the percentage of F2, the length of time the polymer sheet is exposed to the F2, and the temperature at which the application is carried out. One of ordinary skill in the art, based upon the teachings of the disclosure, will readily be able to alter the production conditions given herein in order to produce polymer sheets of the present invention with the desired blocking force.

The percent haze can be measured according to the following technique. An apparatus for measuring the amount of haze, a Hazemeter, Model D25, which is available from Hunter Associates (Reston, Va.), can be used in accordance with ASTM D1003-61 (Re-approved 1977)-Procedure A, using Illuminant C, at an observer angle of 2 degrees. In various embodiments of the present invention, percent haze is less than 5%, less than 3%, and less than 1%.

By virtue of the present invention, it is now possible to provide PVB sheet, and other polymer sheet, in a rolled or stacked form, whereby that sheet is less susceptible to blocking than sheet which does not comprise the fluorine component of the present invention. As a result, the requirement to refrigerate or interleave the PVB sheet during transportation and storage can be reduced or eliminated. In accordance with the present invention, the benefits derived from the enhanced blocking resistance can be achieved without substantially adversely affecting other properties of PVB sheet, e.g., clarity or adhesion to glass.

The PVB and polymer sheet, as described above, also have several advantages over polymer sheet that does not have the $F_2$ agent. First, the PVB sheet having the $F_2$ has a considerably reduced tendency to block while maintaining sufficient optical quality and appropriate adhesion properties to glass. These properties are important when the produced polymer sheet is incorporated into laminated safety glass. By having a reduced tendency to block, the polymer sheet can then be stored and transported with a reduced need for refrigeration. Second, because the $F_2$ agents disclosed above are compatible with the polymer sheet, additional processing steps such as embossing, interleaving, or washing the sheet to remove surface applications such as powder do not need to be performed. Other advantages will be readily apparent to those skilled in the art.

While the invention has been described with reference to exemplary embodiments, it will be understood by those skilled in the,art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

Any figure reference numbers given within the abstract or any claims are for illustrative purposes only and should not be construed to limit the claimed invention to any one particular embodiment shown in any figure.

EXAMPLE 1

Anti-block Properties of Fluorinated PVB

PVB sheet rolls are either untreated (batch 1) or fluorinated (batch 2) on a roll-to-roll fluorination apparatus (in-line fluorination system, model 3, Fluor Technik, Germany) at 40 meters/minute with an $F_2$ concentration of 1% (see table 1, below).

TABLE 1

| Polyvinyl Butyral Resin Formulation | Batch 1 (Control) | Batch 2 |
|---|---|---|
| Triethylene glycol-bis-2-ethyl-hexanoate | 38.0 parts/hundred resin | 38.0 parts/hundred resin |
| UV absorber | 0.25 parts/hundred resin | 0.25 parts/hundred resin |
| Treatment | No | Fluorinated |
| Haze | 0.4% | 0.4% |
| Pummel | 8 | 8 |
| Simulated blocking force (PLI) | 3 | Less than 0.28 |

After fluorination, the rolls are stored at 20° C. for 1 month. After 1 month, the rolls from batch 2 can be unwound without any sign of roll blocking (less than 0.28 PLI) as compared to the non-treated rolls, batch 1, which were very difficult to unwind (3 PLI). Pummel and haze are approximately equivalent in the two batches.

EXAMPLE 2

Control of Glass Adhesion Properties of Fluorinated PVB

PVB sheet rolls with 51 parts per hundred resin of plasticizer are fluorinated on a roll-to-roll fluorination apparatus at different line speeds with an $F_2$ concentration of 1%. FIG. 1 shows the pummel value of the PVB sheet rolls as a function of treatment time. The glass adhesion of the PVB sheet can be controlled by variation of the treatment time.

EXAMPLE 3

Properties of Fluorinated PVB

In this example, PVB sheets are treated with $F_2$ gas at 1% concentration at one atmosphere pressure. The PVB sheet is plasticized with 51 parts per 100 parts PVB resin of triethyleneglycol-bis-(2-diethylhexanoate) and is treated with the $F_2$ gas by using the apparatus described in Example 1 at a line speed of 40 meters/minute (m/min). The resulting sheet is tested for stack sticking (as a test for roll blocking)

by measuring the pulling force needed to separate two strips of sheet from each other. The strips are pressed together at one pound per square inch pressure at 30° C. for 3 hours prior to the separation testing. For $F_2$-treated samples, no pulling force is required, whereas for the untreated sheets, 55 grams per centimeters (g/cm) of force is required. Table two, below, summarizes the results:

TABLE 2

| Treatment | Line Speed | Pummel | Stack Sticking |
|---|---|---|---|
| Fluorinated | 10 m/min | 0 | <5 g/cm |
| Fluorinated | 20 m/min | 0 | <5 g/cm |
| Fluorinated | 30 m/min | 2 | <5 g/cm |
| Fluorinated | 40 m/min | 4 | <5 g/cm |
| Fluorinated | 60 m/min | 8 | <5 g/cm |
| Not Fluorinated | N/A | 8 | 55 g/cm |

Any document or publication cited hereinabove is hereby incorporated by reference in its entirety.

What is claimed is:

1. A method of manufacturing a polymer sheet, comprising:

forming said polymer sheet, wherein said polymer sheet comprises polyvinyl butyral and has two surfaces; and, applying $F_2$ to at least one of said two surfaces.

2. The method of claim 1, wherein said $F_2$ is applied under conditions sufficient to impart a blocking force of less than 2.0 pounds per linear foot.

3. The method of claim 1, wherein said $F_2$ is applied under conditions sufficient to impart a blocking force of less than 1.5 pound per linear foot.

4. The method of claim 1, wherein said $F_2$ is applied under conditions sufficient to impart a blocking force of less than 1.0 pounds per linear foot.

5. The method of claim 1, wherein said $F_2$ is applied under conditions sufficient to impart a blocking force of less than 0.5 pounds per linear foot.

6. The method of claim 1, wherein said $F_2$ is applied under conditions sufficient to impart a blocking force of less than 0.3 pounds per linear foot.

7. The method of claim 1, wherein said polyvinyl butyral comprises 20 to 80 parts plasticizer per one hundred parts of resin.

8. The method of claim 1, wherein said polyvinyl butyral comprises 20 to 60 parts plasticizer per one hundred parts of resin.

9. The method of claim 8, wherein said plasticizer is selected from the group consisting of triethylene glycol di-(2-ethylbutyrate), triethylene glycol di-(2-ethylhexanoate), triethylene glycol diheptanoate, tetraethylene glycol diheptanoate, dihexyl adipate, dioctyl adipate, hexyl cyclohexyladipate, mixtures of heptyl and nonyl adipates, diisononyl adipate, heptylnonyl adipate, dibutyl sebacate, polymeric plasticizers, oil-modified sebacic alkyds, mixtures of phosphates and adipates, adipates, mixed adipates made from $C_4$ to $C_9$ alkyl alcohols and cyclo $C_4$ to $C_{10}$ alcohols, $C_6$ to $C_8$ adipate esters, and hexyl adipate.

10. The method of claim 1, further comprising rolling said polymer sheet in the form of a roll or disposing said polymer sheet in a stack of equivalent polymer sheets.

11. The method of claim 1, wherein said $F_2$ is mixed with an inert gas.

12. The method of claim 1, wherein said $F_2$ is applied to said polymer sheet at a pressure of one atmosphere.

13. The method of claim 1, wherein said $F_2$ is applied to said polymer sheet for between 0.1 and 10 seconds.

14. The method of claim 1, wherein said $F_2$ is applied to said polymer sheet at a pressure of between 0.1 and 50 atmospheres.

15. The method of claim 1, wherein said $F_2$ is applied to said polymer sheet at a pressure of between 0.75 and 10 atmospheres.

16. A polymer sheet comprising polyvinyl butyral, wherein said polymer sheet is made by the process of:

forming said polymer sheet, wherein said polymer sheet has two surfaces; and, applying $F_2$ to at least one of said two surfaces.

17. The polymer sheet of claim 16, wherein said $F_2$ is applied in a concentration sufficient to impart a blocking force of less than 2.0 pounds per linear foot.

18. The polymer sheet of claim 16, wherein said $F_2$ is applied in a concentration sufficient to impart a blocking force of less than 1.5 pounds per linear foot.

19. The polymer sheet of claim 16, wherein said $F_2$ is applied in a concentration sufficient to impart a blocking force of less than 1.0 pounds per linear foot.

20. The polymer sheet of claim 16, wherein said $F_2$ is applied in a concentration sufficient to impart a blocking force of less than 0.5 pounds per linear foot.

21. The polymer sheet of claim 16, wherein said $F_2$ is applied in a concentration sufficient to impart a blocking force of less than 0.3 pounds per linear foot.

22. The polymer sheet of claim 16, wherein said polyvinyl butyral comprises 20 to 80 parts plasticizer per one hundred parts of resin.

23. The polymer sheet of claim 16, wherein said polyvinyl butyral comprises 20 to 60 parts plasticizer per one hundred parts of resin.

24. The polymer sheet of claim 23, wherein said plasticizer is selected from the group consisting of triethylene glycol di-(2-ethylbutyrate), triethylene glycol di-(2-ethylhexanoate), triethylene glycol diheptanoate, tetraethylene glycol diheptanoate, dihexyl adipate, dioctyl adipate, hexyl cyclohexyladipate, mixtures of heptyl and nonyl adipates, diisononyl adipate, heptylnonyl adipate, dibutyl sebacate, polymeric plasticizers, oil-modified sebacic alkyds, mixtures of phosphates and adipates, adipates, mixed adipates made from $C_4$ to $C_9$ alkyl alcohols and cyclo $C_4$ to $C_{10}$ alcohols, $C_6$ to $C_9$ adipate esters, and hexyl adipate.

25. The polymer sheet of claim 16, wherein said polyvinyl butyral comprises about 13 to about 30 weight percent hydroxyl groups calculated as PVOH.

26. The polymer sheet of claim 16, wherein said polymer sheet is in the form of a roll or is disposed in a stack of equivalent polymer sheets.

27. A laminated glass structure comprising a layer of glass disposed in contact with a polymer sheet, wherein said polymer sheet comprises polyvinyl butyral and wherein said polymer sheet is made by the process of:

forming said polymer sheet, wherein said polymer sheet has two surfaces; and, applying $F_2$ to at least one of said two surfaces.

28. The laminated glass structure of claim 27, wherein said polyvinyl butyral comprises 20 to 80 parts plasticizer per one hundred parts of resin.

29. The laminated glass structure of claim 27, wherein said polyvinyl butyral comprises 20 to 60 parts plasticizer per one hundred parts of resin.

30. The laminated glass structure of claim 29, wherein said plasticizer is selected from the group consisting of triethylene glycol di-(2-ethylbutyrate), triethylene glycol di-(2-ethylhexanoate), triethylene glycol diheptanoate, tetraethylene glycol diheptanoate, dihexyl adipate, dioctyl adipate, hexyl cyclohexyladipate, mixtures of heptyl and nonyl adipates, diisononyl adipate, heptylnonyl adipate, dibutyl sebacate, polymeric plasticizers, oil-modified sebacic alkyds, mixtures of phosphates and adipates, adipates, mixed adipates made from $C_4$ to $C_9$ alkyl alcohols and cyclo $C_4$ to $C_{10}$ alcohols, $C_6$ to $C_8$ adipate esters, and hexyl adipate.

31. The laminated glass structure of claim 27, wherein said polyvinyl butyral comprises about 13 to about 30 weight percent hydroxyl groups calculated as PVOH.

32. The laminated glass structure of claim 27, further comprising a second layer of glass disposed in contact with said polymer sheet.

* * * * *